United States Patent [19]

Cushman

[11] 4,200,925
[45] Apr. 29, 1980

[54] INERTIAL INSTRUMENT WITH A MULTIPLEXED REBALANCE NETWORK

[75] Inventor: Glenn F. Cushman, Norfolk, Mass.

[73] Assignee: Northrop Corporation, Los Angeles, Calif.

[21] Appl. No.: 922,818

[22] Filed: Jul. 10, 1978

[51] Int. Cl.² .............................................. G06F 15/50
[52] U.S. Cl. .................................... 364/107; 318/562; 318/636; 364/118; 364/453
[58] Field of Search ............... 364/107, 111, 118, 434, 364/453; 318/562, 636

[56] References Cited

U.S. PATENT DOCUMENTS

| | | | |
|---|---|---|---|
| 3,284,617 | 11/1966 | Lerman | 364/453 |
| 3,417,235 | 12/1968 | Clark et al. | 318/562 |
| 3,465,332 | 9/1969 | Neal et al. | 318/562 X |
| 3,582,621 | 6/1971 | Lawler | 318/636 X |
| 3,694,631 | 9/1972 | Cushman | 364/453 X |
| 3,777,128 | 12/1973 | Kirkham | 318/636 X |
| 3,872,284 | 3/1975 | Seligman et al. | 364/453 |
| 3,944,903 | 3/1976 | Clegg | 318/562 X |
| 3,987,282 | 10/1976 | Lau et al. | 364/118 |
| 4,038,590 | 7/1977 | Knowlton | 318/562 |

Primary Examiner—Jerry Smith
Attorney, Agent, or Firm—Kenway & Jenney

[57] ABSTRACT

An inertial instrument including a multiplexed rebalance network and an associated plurality of inertial sensors and associated position signal generators, and torquers. The rebalance network includes a sampling network, a computing network, and a conversion and distribution network. The sampling network generates a succession of digital position words representative of a corresponding succession of sampled values for the position signals. The computing network successively transforms each of the digital position signals into digital rebalance loop compensation signals for the corresponding inertial sensor. The conversion and distribution network converts the digital rebalance loop compensation signals to rebalance torquer signals and applies those signals to the respective torquers.

10 Claims, 4 Drawing Figures

INERTIAL INSTRUMENT WITH A MULTIPLEXED REBALANCE NETWORK

BACKGROUND OF THE INVENTION

This invention relates to inertial instrumentation, and more particularly to rebalance control networks for multiple inertial sensor instruments.

There are many inertial instruments in the prior art which utilize multiple inertial sensors. By way of example, the individual inertial sensors may be single degree of freedom (SDF) gyros, dynamically tuned (two degree of freedom) gyros, or accelerometers, or other known sensors. A typical multiple sensor instrument is an attitude reference assembly for a missile guidance system, which includes six single degree of freedom inertial sensors (three gyros and three accelerometers). In the conventional inertial instruments, each inertial sensor is embodied in a torque-to-balance loop. In addition to the inertial sensor, the loop includes, (1) a signal generator (such as a microsyn) for producing a signal representative of the sensor position, (2) a rebalance loop compensation network for modifying the signal generator output signal in accordance with desired performance characteristics, and (3) a torquer which is responsive to the modified signal generator output signal to rebalance the inertial sensor.

Typically, each inertial sensor in the instrument and its associated rebalance network includes all of the above-noted elements to form a corresponding plurality of full rebalance networks. For the rebalance loop bandwidths that are typically used, the multiplicity of circuit elements in the loop networks is relatively inefficient in terms of cost, weight, and volume, the latter factors being particularly important in terms of payload for missile applications.

Accordingly, it is an object of the present invention to provide a multiple sensor inertial instrument having a single time-shared rebalance loop network.

SUMMARY OF THE INVENTION

In one form of the present invention, a multiple inertial sensor instrument having a rebalance control system includes a multiplexer adapted to sequentially scan the signal generators of a plurality of inertial sensors at a predetermined multiplexing rate, to provide a signal comprising portions of the gyro position signals from the respective signal generators. A sample-and-hold network samples the composite signal from the multiplexer at a sampling rate matching the multiplexing rate, and holds the sampled value. An analog-to-digital converter transforms the succession of held signals to a digital position signal comprising a succession of digital position words, each word being representative of the corresponding held signal. A programmed microprocessor is operated on an interrupt basis at the sampling rate to generate a succession of digital rebalance words signals corresponding to the succession of position words. A conversion and distribution network transforms each of the digital rebalance words to a torquer signal, which is then routed to complete the rebalance loop configuration for each of the inertial sensors. With this configuration, a single, time-shared network serves as the rebalance network for all of the inertial sensors.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
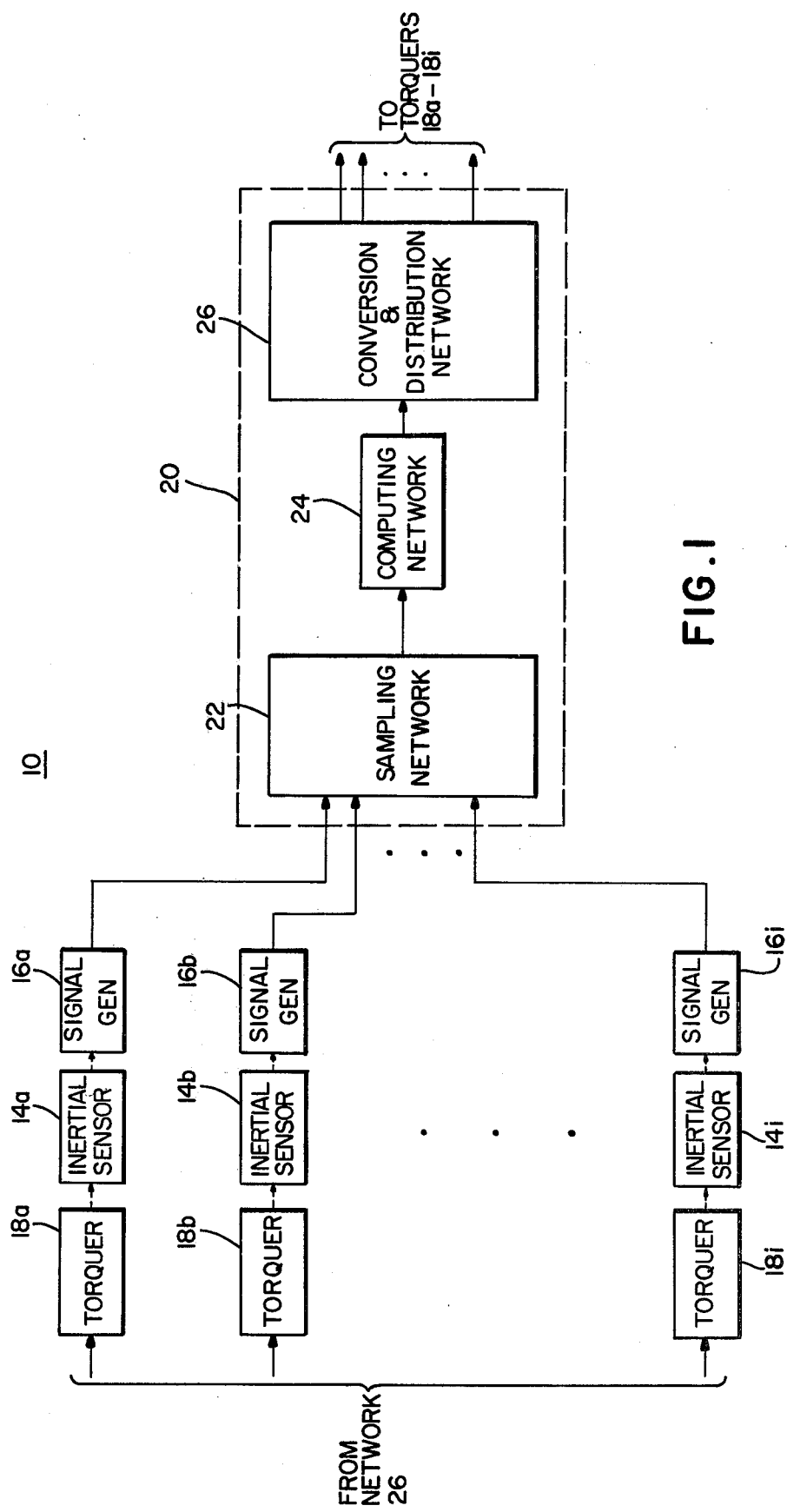
FIG. 1 shows, in block diagram form, an exemplary embodiment of the present invention.

FIG. 1 shows an embodiment of the present invention in block diagram form. In that figure, an inertial instrument 10 includes a plurality of inertial sensors 14a, 14b, ... 14i, with each inertial sensor having an associated one of signal generators 16a, 16b, ... 16i, and torquers 18a, 18b, ... 18i. The broken-line arrows between the torquers and sensors, and between the signal generators and sensors, represent the coupling between those elements.

Each of the inertial sensors may be conventional in form, for example, a type GI-G6 single degree of freedom gyro and associated microsyn signal generator and permanent magnet torquer, manufactured by Northrop Corporation, Norwood, Mass. In alternative systems, one or more of the inertial sensors may be a Northrop type APG-6 accelerometer (which is similar to the GI-G6 gyro except that the gyro wheel is replaced with a pendulous mass element) and associated signal generator and torquer.

In operation, the sampling network 22 successively samples the position signals provided by the signal generators of sensors 14a-14i. Networks 22 produces a succession of digital position words representative of the succession of sampled values from the position signals. The computing network 24 successively transforms each of the digital position words into a digital rebalance word for the corresponding inertial sensor. The conversion and distribution network 26 converts each of the digital rebalance words to a torquer signal and then applies that torquer signal to that torquer.

Figure 2:
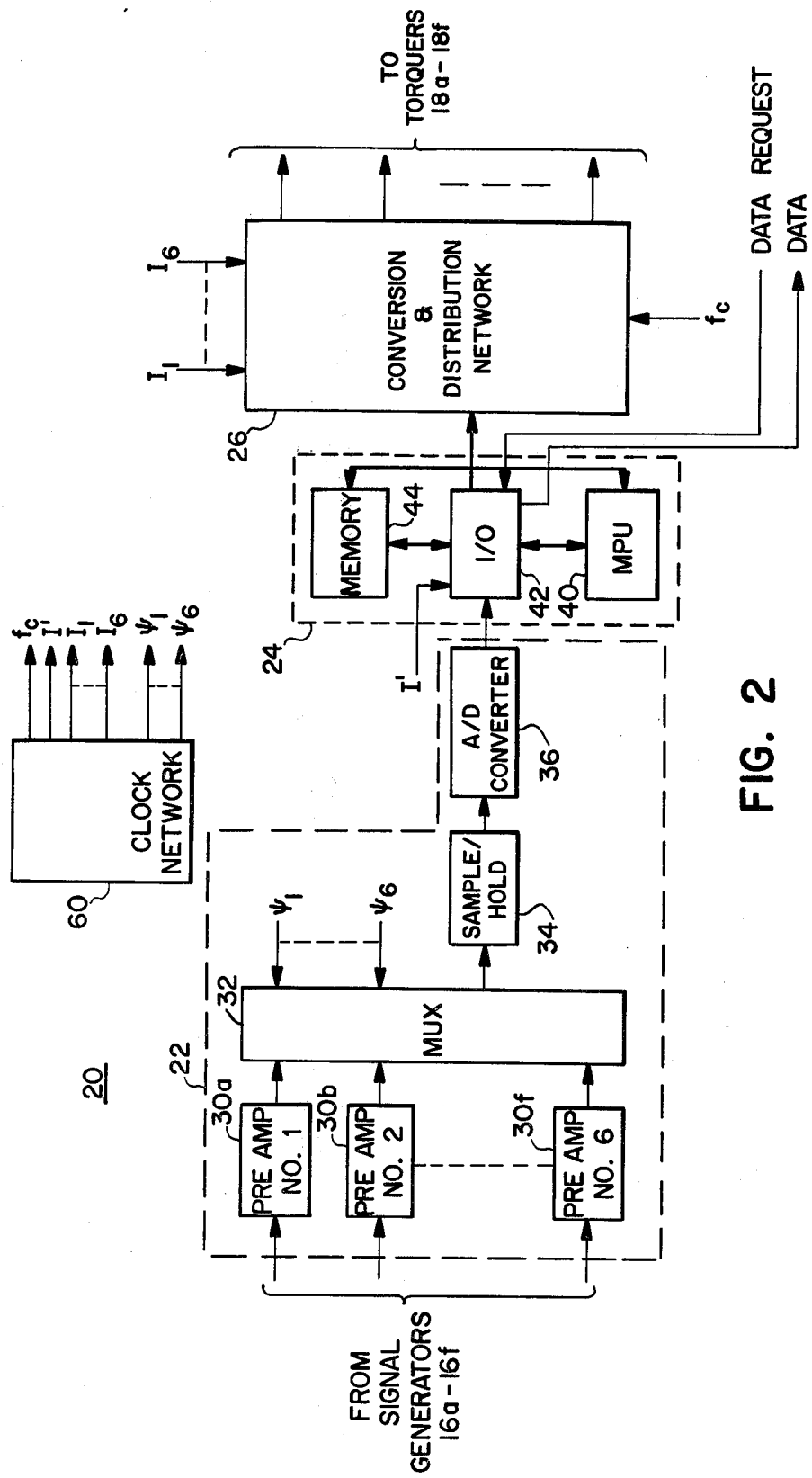
FIG. 2 shows, in block diagram form, an exemplary multiplexed rebalance network for the system of FIG. 1.

FIG. 2 shows an embodiment of a multiplexed rebalance network suitable for use with a six-rebalance loop embodiment of the present invention. This exemplary system is representative of one that might be used in a strap-down inertial instrument for a missile and includes six single degree of freedom inertial sensors: three gyros (corresponding to sensors 12a-12c) and three accelerometers (corresponding to sensors 12d-12f). In FIG. 2, elements corresponding to similar elements in FIG. 1 are identified with identical reference designations.

As shown in FIG. 2, network 20 has six input channels, each coupled from the signal generator of one of inertial sensors 12a-12f. The sampling network 22 includes preamplifiers 30a-30f associated with a respective one of the input channels, multiplexer 32, sample-and-hold network 34, and analog-to-digital (A/D) converter 36. The computing network 24 includes a microprocessing unit (MPU) 40, input/output network 42 and memory 44.

Figure 3:
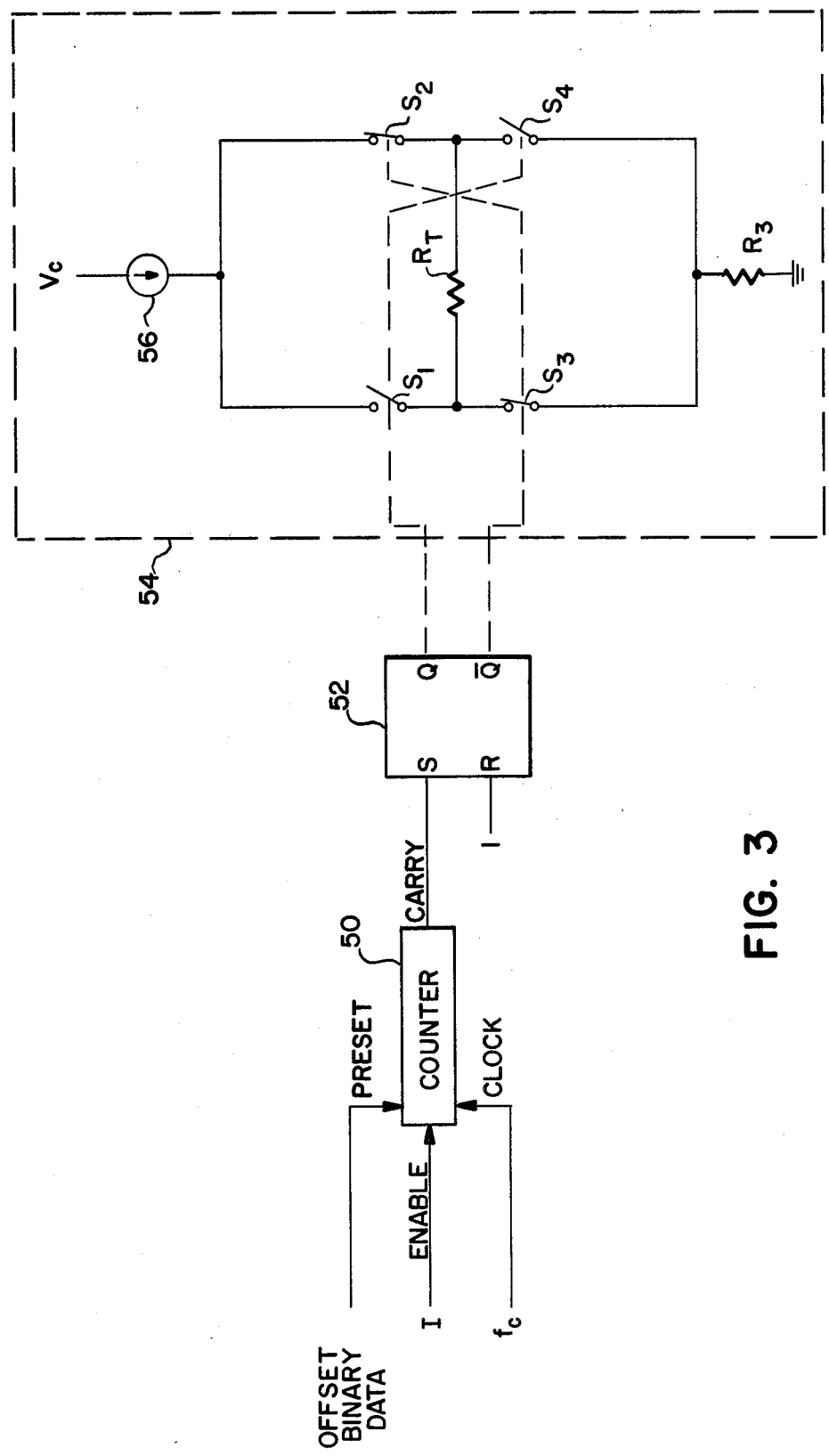
FIG. 3 shows, partially in schematic and partially in block diagram form, a portion of an exemplary conversion network of the system of FIG. 1.

The conversion portion of network 26 for one of the six channels of the present embodiment is shown in FIG. 3. This portion includes synchronous counter 50, set-reset flip-flop 52, and "H" bridge 54. Bridge 54 includes ganged switches S1 and S4 coupled to the Q output of flip-flop 52, ganged switches S2 and S3 coupled to the $\bar{Q}$ output of the flip-flop 52, and current source 56. The torquer for the associated channel is represented by resistor $R_T$.

Figure 4:
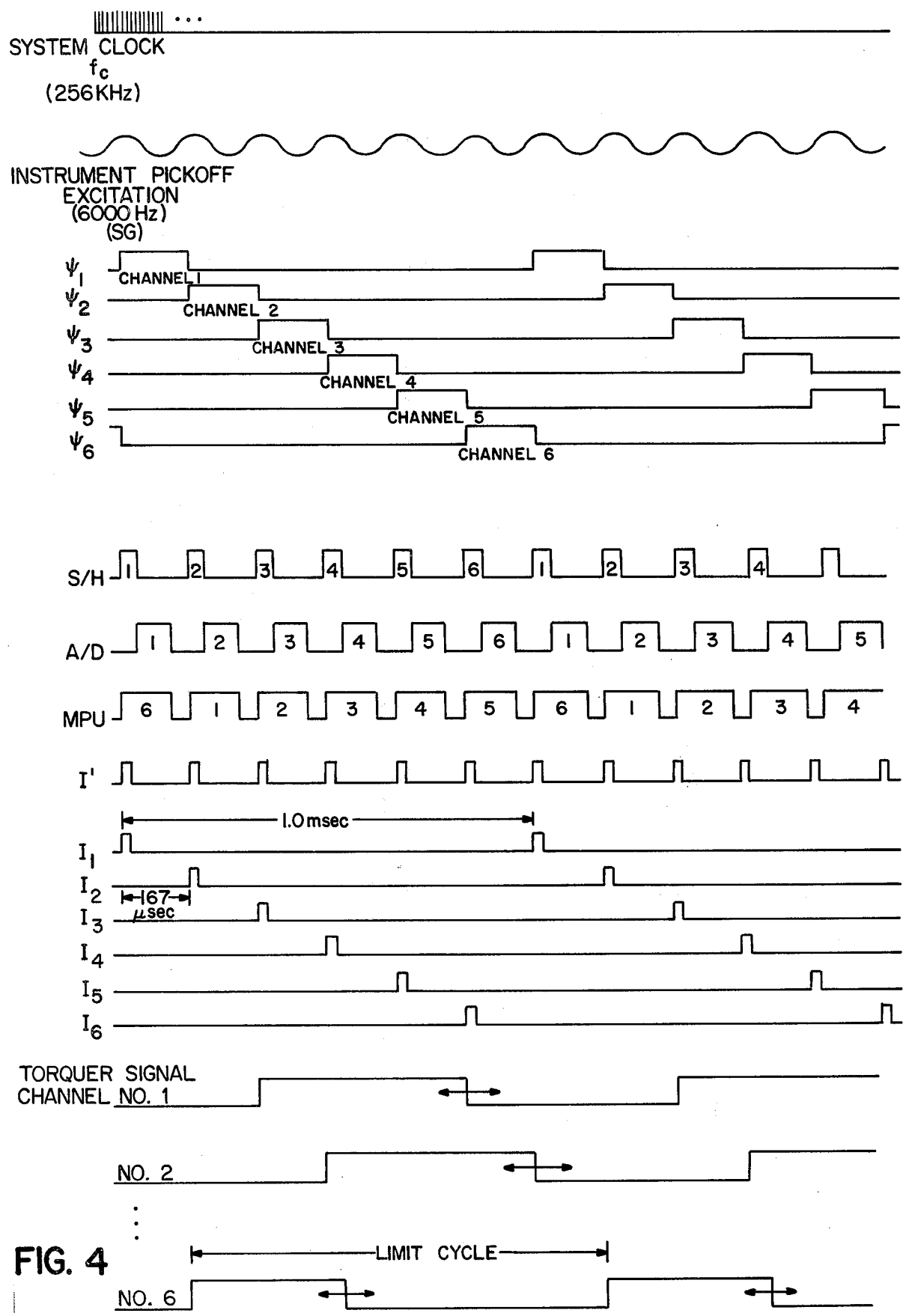
FIG. 4 shows waveforms illustrating the operation of the system of FIGS. 1-3.

A clock network 60 provides various timing signals for the rebalance network 20, including the 256 MHz system clock ($f_c$), as illustrated in FIG. 4, together with other systems of waveforms.

The system operation will now be described in detail using the diagrams of FIGS. 1-3 and the waveforms shown in FIG. 4. In operation, the microsyn signal generator of each inertial sensor produces an instrument pickoff excitation signal at 6000 Hz (representative of the sensor position), represented for one channel at the line denoted SG of FIG. 4. The excitation signals are amplified by the respective channel preamplifiers. The output signals from the preamplifiers are sequentially sampled by multiplexer 32 in response to the multiplexing clock signals $\Psi_1$-$\Psi_6$ shown in FIG. 4.

The multiplexed signal produced by multiplexer 32 is then sampled and held by network 34 during the respective channel periods denoted by the reference numerals in the S/H waveform of FIG. 4. After the sampling operation is complete, A/D converter 36 is operative to convert the resulting d.c. signal to a parallel digital word for the respective samples during the periods denoted by the respective numerals in the A/D waveforms of FIG. 4. This digital signal is then made available to the I/O section 42 of computing network 24.

The clock network 60 also produces an interrupt signal I' and pulse signals $I_1$-$I_6$ at the basic channel sampling rate as shown in FIG. 4.

In response to each pulse in the interrupt signal, MPU 40 is operative for a channel during the respective period indicated by MPU waveform of FIG. 4 to interrupt its operation, read the current digital word from the A/D converter 36, and then using that word as an input to a loop compensation subroutine, compute a digital rebalance word for the respective loop. The loop compensation can have many variations depending on specific applications. In the present embodiment, for example, the compensation for channel 1 has the following form.

$$H(S)=K_1(T_1S+1)/s$$

In this embodiment, $K_1$ and $T_1$ are selected to be powers of two, so that the multiplication and division may be performed by register shifting operations. With a Motorola type 6800 microprocessor, such operations are accomplished within 100 microseconds. The program for MPU 40 is shown in the Appendix. In alternative embodiments, the MPU 40 may readily be programmed to generate the digital rebalance word by first using the loop compensation function and then by modifying this result by appropriate functions for scale factor correction, mass unbalance corrections and bias corrections. These functions are well known for conventional inertial sensor assemblies.

In the present embodiment, the torquer rebalance digital rebalance word is initially provided in 2's complementary binary form, and then converted to offset binary by complementing the most significant bit. At the conclusion of this routine, the digital rebalance word is present in offset binary form at the output of the microprocessor.

In the present embodiment, a continuous drive pulse width modulated binary signal is used to drive the permanent magnet torquers of the inertial sensors. In alternative configurations, other torquing techniques are suitable. For example, both free and width modulated ternary torquing techniques could be used with either permanent magnet or reluctance type torquers, with only minor modifications in system timing and software required.

Upon receipt of the various pulses from the $I_1$-$I_6$ signals, the offset binary words are diverted to the appropriate channel conversion portion of network 26. For the exemplary portion of network 26 shown in FIG. 3, the offset word is used to preset an 8-bit synchronous counter 50. At the termination of the I pulse for the channel, the counter 50 starts counting at the clock rate $f_c$. Depending on the preset value, the counter overflows at a unique time during the next one millisecond. The resultant overflow pulse is then used to set the flip-flop 52 which controls the ganged semiconductor switches S1-S4 in the H bridge 54. At the time switches change position, the current flow direction in the torquer winding is reversed. Thus, a continuous drive, quantized (one part in 256 for this system) pulse width modulation signal is generated from the 8-bit 2's complement parallel output signal. Exemplary torquing signals for channels 1-6 are illustrated in FIG. 4.

Accordingly, with the present embodiment, the technique of sequentially processing sensor data during specified time blocks provides the multiplexing of six channels and a relatively high sampling rate with low cost commercially available microprocessor and associated circuit elements. In this embodiment, a sampling rate of 1,000 times a second per channel is more than adequate to satisfy the 50-100 Hz loop bandwidth requirements of the typical tactical system applications. To read torquing data out of the microprocessing based system, the MPU need only compute the net torque required per limit cycle and accumulate this data in an erasable memory (RAM) for each channel. Through an interrupt routine, another computer for example can on a periodic basis retrieve this data.

Also, since the loop compensation is handled on an interrupt basis by a microprocessor, as with the data read-out, it is possible to use the microprocessor down time to perform other data conversion and system functions. Typical operations that could be performed by the MPU are: (1) correction of instrument data for scale factor, bias and misalignment, (2) correction of sensor data for mass unbalance, (3) systems self-test and fault monitoring, and (4) correction of data for sensitivity to variations of other forcing functions, such as temperature and voltage. With respect to the self-test function, the microprocessor may be programmed to periodically "open" a rebalance loop, insert a test rebalance word, and measure the resultant rebalance word provided by the normal compensation function. In this manner the system response may be measured on a self-test mode.

The invention may be embodied in other specific forms without departing from the spirit or essential characteristics thereof. The present embodiments are therefore to be considered as illustrative and not restrictive, the scope of the invention being defined by the appended claims.

APPENDIX

| Memory Location | Instruction | Mnemonic |
|---|---|---|
| A000 | 00 | |
| A001 | 84 | MANUAL |
| 0040 | 00 | INITIALIZATION |
| 41 | 00 | |
| 0060 thru 0077 | 00 | |
| 001C | 0F | SEI |
| 001D | 8E | LDS |
| 1E | 00 | |
| 1F | FF | |
| 0020 | 86 | LDA |
| 21 | 00 | |
| 22 | B7 | STA |
| 23 | 80 | |
| 24 | 04 | |
| 25 | 86 | LDA |
| 26 | 1F | |
| 27 | B7 | STA |
| 28 | 80 | |
| 29 | 05 | |
| 002A | 86 | LDA |
| 2B | FF | |
| 2C | BT | STA |
| 2D | 80 | |
| 2E | 06 | |
| 2F | 86 | LDA |
| 0030 | 36 | |
| 31 | B7 | STA |
| 32 | 80 | |
| 33 | 07 | |
| 34 | 0E | CLI |
| 35 | 3E | WAI |
| 36 | 20 | BRA |
| 37 | FD | |
| 0084 | DE | LDX |
| 85 | 40 | |
| 86 | B6 | LDA |
| 87 | 80 | |
| 88 | 05 | |
| 89 | 2B | BMI |
| 008A | 08 | |
| 8B | 8C | CPX |
| 8C | 00 | |
| 8D | 00 | |
| 8E | 26 | BNE |
| 8F | 06 | |
| 90 | DF | STX |
| 91 | 40 | |
| 92 | 3B | RTI |
| 93 | CE | LDX |
| 94 | 00 | |
| 95 | 60 | |
| 96 | F6 | LDA |
| 97 | 80 | |
| 98 | 04 | |
| 99 | 37 | ISH |
| 009A | 57 | ASR |
| 9B | 57 | ASR |
| 9C | 57 | ASR |
| 9D | A6 | LDA |
| 9E | 00 | |
| 9F | 1B | ABA |
| A0 | 29 | BVS |
| A1 | 07 | |
| A2 | A7 | STA |
| A3 | 00 | |
| A4 | 33 | PUL |
| A5 | 1B | ABA |
| A6 | 28 | BVC |
| A7 | 04 | |
| A8 | 34 | DES |
| A9 | 33 | PUL |
| 00AA | 20 | BRA |
| AB | 01 | |
| AC | 16 | TAB |
| AD | 58 | ASL |

APPENDIX-continued

| Memory Location | Instruction | Mnemonic |
|---|---|---|
| AE | 25 | BCS |
| AF | 07 | |
| 00B0 | 86 | LDA |
| B1 | 7F | |
| B2 | 10 | SBA |
| B3 | 2B | BMI |
| B4 | 09 | |
| B5 | 20 | BRA |
| B6 | 0D | |
| B7 | 86 | LDA |
| B8 | 80 | |
| B9 | 1B | ABA |
| BA | 2B | BMI |
| BB | 06 | |
| BC | 20 | BRA |
| BD | 06 | |
| BE | C6 | LDA |
| BF | 7E | |
| 00C0 | 20 | BRA |
| C1 | 02 | |
| C2 | 06 | LDA |
| C3 | 80 | |
| C4 | F7 | STA |
| C5 | 80 | |
| C6 | 06 | |
| C7 | 0C | CLC |
| C8 | EB | ADD |
| C9 | 0C | |
| CA | E7 | STA |
| CB | 0C | |
| CC | 08 | INX |
| CD | C6 | LDA |
| CE | 00 | |
| CF | E9 | ADC |
| 00D0 | 0C | |
| D1 | E7 | STA |
| D2 | 0C | |
| D3 | 08 | |
| D4 | DF | STX |
| D5 | 40 | |
| D6 | 3B | RTI |

What is claimed is:

1. A multiple rebalance loop inertial instrument comprising:
    an inertial sensor for each of said rebalance loops, each sensor having an associated means for generating a position signal and having an associated torquer means for applying a torque to said sensor in response to an applied torquer signal,
    a rebalance network coupled to said inertial sensors, said network including:
    A. sampling means for successively sampling said position signals and for generating a digital position signal comprising a succession of digital position words, wherein each digital position word in said succession is representative of the value of one of said position signals at the corresponding sample time,
    B. computing means responsive to said succession of digital position signals to generate a corresponding succession of digital rebalance words,
    C. means for converting each of said digital rebalance words to a torquer signal and for applying that torquer signal to the torquer means of the corresponding inertial sensor.

2. Apparatus according to claim 1 wherein said sampling means comprises:
    a multiplexer means for generating a time division multiplex (TDM) signal comprising successive portions of the position signals, a sample-and-hold means for sampling and holding in succession the value of each of said portions at a sampling time during said portion, and an analog-to-digital conversion means for generating said digital position words from the succession of held values, each of said digital position words corresponding to one of said held values.

3. Apparatus according to claim 1 wherein said converting means includes means for producing said torquer signal in binary form, said torquer signal for each digital position signal having a duty cycle representative of the corresponding digital rebalance word.

4. Apparatus according to claim 1 wherein said computing means is a programmed microprocessor adapted to generate said digital rebalance signals on an interrupt basis at the sampling rate of said sampling means.

5. Apparatus according to claim 4 wherein said microprocessor is further adapted to generate said digital rebalance signals for each loop in accordance with a predetermined loop compensation function.

6. Apparatus according to claim 5 wherein said microprocessor is further adapted to generate said digital rebalance signals for each loop in accordance with a scale factor function.

7. Apparatus according to claim 5 wherein said microprocessor is further adapted to generate said digital rebalance signals for each loop in accordance with a mass unbalance function.

8. Apparatus according to claim 5 wherein said microprocessor is further adapted to generate said digital rebalance signals for each loop in accordance with a bias offset function.

9. Apparatus according to claim 5 wherein said microprocessor is further adapted to generate said digital rebalance signals for each loop in accordance with a self-test function whereby the loop response is measured for a test rebalance word.

10. Apparatus according to claims 1 or 2 or 3 or 4 wherein said means for converting said digital rebalance words to a torquer signal includes:

A. counter means associated with each of said rebalance loops, said counter means each being responsive to an applied clock pulse to increment or decrement its count state, said counter means each including means for periodically resetting to a predetermined count state representative of the rebalance period of the respective loop, B. means for presetting each of said counter means to a preset count state in response to a signal generated by said computing means, said preset count state being representative of a desired duty cycle for the rebalance period for the respective rebalance loops as determined by said computing means, C. means for generating said torquer signal from each of said counter means, said torquer signal having a first value before said counter has counted the number of clock pulses corresponding to its preset count state in each rebalance period and having a second value otherwise in each rebalance period.

* * * * *